US009709974B2

(12) United States Patent  
Jiang

(10) Patent No.: US 9,709,974 B2  
(45) Date of Patent: Jul. 18, 2017

(54) OPEN NUMERIC CONTROL SYSTEM WITH REAL TIME KERNEL AND A REAL-TIME CONTROL METHOD OF A TOOL PATH

(76) Inventor: Junfeng Jiang, Shenzhen (CN)

( * ) Notice: Subject to any disclaimer, the term of this patent is extended or adjusted under 35 U.S.C. 154(b) by 616 days.

(21) Appl. No.: 14/349,064

(22) PCT Filed: Jul. 6, 2012

(86) PCT No.: PCT/CN2012/078296  
§ 371 (c)(1),  
(2), (4) Date: Apr. 1, 2014

(87) PCT Pub. No.: WO2013/013570  
PCT Pub. Date: Jan. 31, 2013

(65) Prior Publication Data  
US 2014/0228998 A1 Aug. 14, 2014

(30) Foreign Application Priority Data  
Jul. 22, 2011 (CN) .......................... 2011 1 0206679

(51) Int. Cl.  
*G05B 19/19* (2006.01)  
*G05B 19/414* (2006.01)

(52) U.S. Cl.  
CPC .......... *G05B 19/19* (2013.01); *G05B 19/414* (2013.01); *G05B 2219/34093* (2013.01); *G05B 2219/34403* (2013.01)

(58) Field of Classification Search  
None  
See application file for complete search history.

(56) References Cited

U.S. PATENT DOCUMENTS

| 4,513,380 A | * | 4/1985 | Spooner | G05B 19/186 |
| | | | | 409/69 |
| 5,453,933 A | * | 9/1995 | Wright | G05B 19/414 |
| | | | | 700/181 |

(Continued)

OTHER PUBLICATIONS

Chen et al. "Design and Implement of a Modularized CNC Interpreter based on the Integration of Tool Path Planning Module", 2012 IEEE, pp. 613-616.*

(Continued)

*Primary Examiner* — Van Nguyen

(57) ABSTRACT

The present invention discloses a real-time kernel of open CNC systems and a real-time control method of tool-paths. The real-time kernel translates a real-time control of the tool-paths into sending synchronous pulses into the servo drivers in accordance with the control rhythms $\Delta t_i$ ($i=1, \ldots, n$) in the follow-table and achieves the openness of real-time control method and real-time control process. The real-time kernel has the most simple and reliable multi-axis synchronization capability with high-speed and high-precision, and leads to major changes in the field of digital control method. The real-time kernel no need to configure a real-time operating system and a fieldbus, its core function is only to write the control rhythm into the T-division timer, and to send linkage commands into the servo drivers designated by the state-word, therefore its function and architecture are extremely simple and high reliability.

2 Claims, 1 Drawing Sheet

(56) References Cited

U.S. PATENT DOCUMENTS

| | | | | |
|---|---|---|---|---|
| 6,504,333 B2* | 1/2003 | Takahashi | ............... | G05B 19/41 |
| | | | | 318/570 |
| 6,647,314 B2* | 11/2003 | Kato | ................. | G05B 19/4103 |
| | | | | 318/571 |
| 7,451,013 B2* | 11/2008 | Coleman | .......... | G05B 19/40937 |
| | | | | 700/159 |
| 8,121,720 B2* | 2/2012 | Tsai | ................... | G05B 19/4103 |
| | | | | 700/160 |
| 8,489,224 B2* | 7/2013 | Berman | ............. | G05B 19/4093 |
| | | | | 700/159 |
| 8,725,283 B2* | 5/2014 | Gray | ................. | G05B 19/4069 |
| | | | | 700/103 |
| 9,052,704 B2* | 6/2015 | Berman | ............. | G05B 19/4093 |

OTHER PUBLICATIONS

Lin et al. "Design and Development of the Self-adaptive Tool Path Decision-making CNC Platform", 2012 IEEE, pp. 135-137.*

Zhang et al. "Reliability Design of CNC System", 2011 IEEE, pp. 1140-1142.*

* cited by examiner

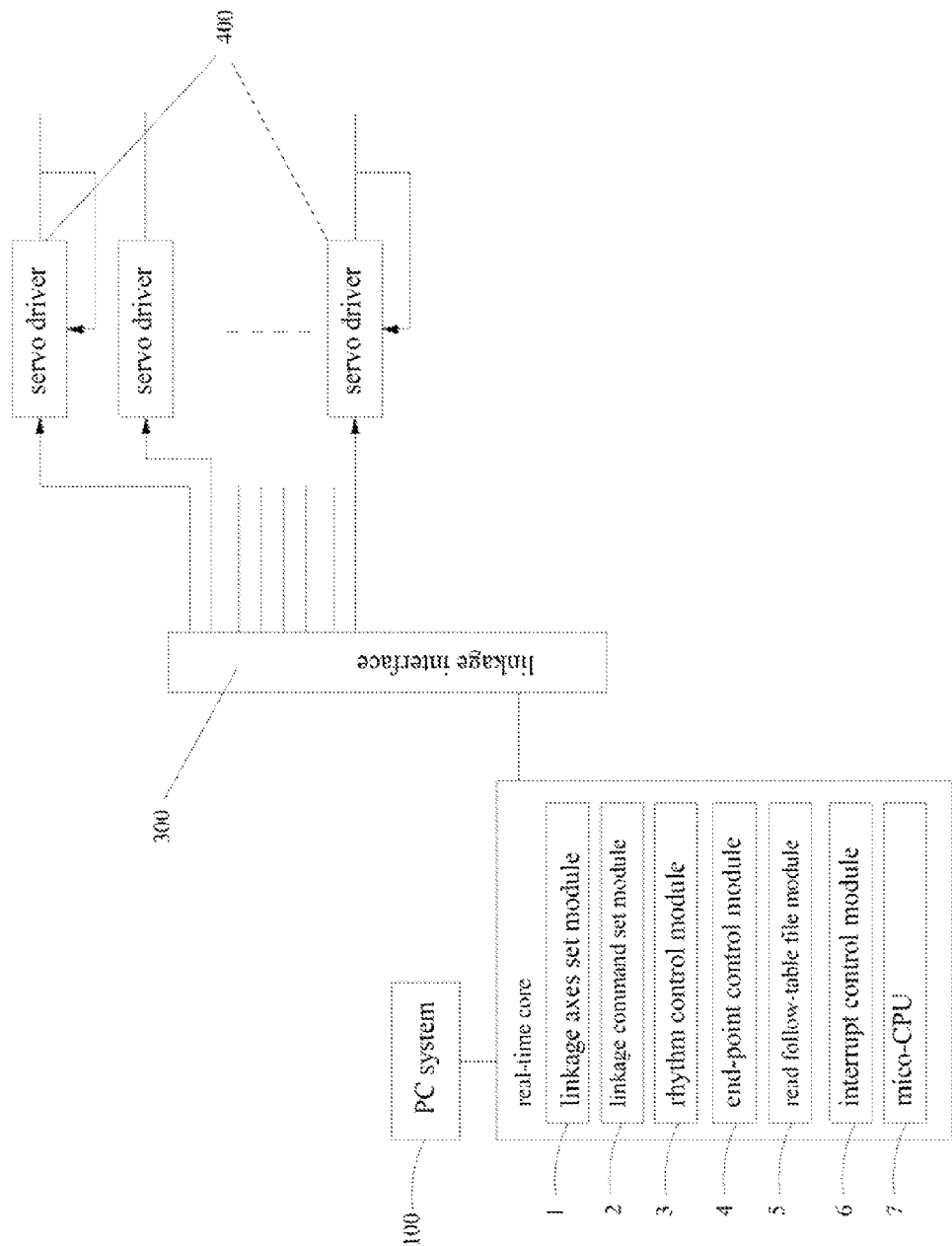

ND A REAL-TIME CONTROL METHOD OF A TOOL PATH

OPEN NUMERIC CONTROL SYSTEM WITH REAL TIME KERNEL AND A REAL-TIME CONTROL METHOD OF A TOOL PATH

CROSS REFERENCE OF RELATED APPLICATION

This is a national phase national application of an international patent application number PCT/CN2012/078296 with a filing date of Jul. 6, 2012, which claims priority of a CHINA application number 201110206679.6 with a filing date of Jul. 22, 2011. The contents of these specifications, including any intervening amendments thereto, are incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates generally to advanced control and advanced manufacturing, specifically to a real-time kernel of open CNC systems and a real-time control method of tool-paths.

Description of Related Arts

The architecture of open CNC systems defined by the IEEE is based on a real-time operating system (RTOS).

Under the real-time operating system, the management mechanism for internal/external resources and contingency mechanism for the internal/external environment changes are tightly coupled together with computation rules of iterative interpolation control algorithm, and a universal control method is formed, that is the iterative interpolation method. The real-time operating system thus becomes the real-time control center of a real-time interpolation iterative process.

The iterative interpolation control method has run through the overall history of CNC technology since the 1970s, and has created the "interpolation era" of CNC systems.

Before the 1970s, the computers are basically only used in the field of scientific computation, its facing problem is to manage application programs for multiple users, and the operating system oriented multi-user is resulted. In the 1980s, computers are widely used in real-time control of the production process. In order to solve the real-time of operating system, a real-time kernel is embedded in the usual multi-user time-sharing operating system, and that is real-time operating system. For example, in the PC, for Windows and Linux, RTX and RTLinux are widely used real-time kernels.

Literature "CNC principles, systems and applications PC-based" (author: Zhou Kai, Machinery Industry Press in July 2007 1st Edition •2nd printing) pointed out that the real-time kernel is a core of CNC software systems for the existing PC-based open CNC systems. Architecture, design and operation management of CNC software systems, for example, "multi-tasking software design by means of multi-process and multi-threading", "real-time software design with real-time and reliability", "coordinated operation and information exchange between real-time software and non-real-time software" and so on, are dependent on the real-time kernel.

The "Technical Committee of Open Systems" of IEEE defines an open system as follows: "An open system provides capabilities that enable property implemented applications to run on a variety of platforms from multiple vendors, interoperate with other system applications and present a consistent style of interaction with the user" (IEEE 1003.0).

The Chinese National Standard "GB/T 18759.1-2002 mechanical and electrical equipment •open CNC systems—Part 1: General Principles •3.1" seizes the nature of the IEEE definition and follows its basic principle, the openness is straightforwardly defined as "plug-and-play" of application software, its definition of the open CNC systems is as follows: "An open CNC system runs on a system platform constructed according to the principles such as the publicity, scalability and compatibility, and possess the portability, interoperability and consistency of human-machine interface."

These definitions mean that the architecture of the existing open CNC system is completely computerized by the IEEE. Therefore, the open CNC system is configured a general-purpose computer system with a real-time operating system, and CNC software system is merely the special application software.

The essential of real-time is timing predictability, it means that running time of all tasks are predictable under the operating system, that is, the real-time is the ability of the operating system to respond and handle external events in the foreseeable time. Therefore, the so-called real-time kernel, operating system and necessarily involves the process scheduling/thread scheduling related precision clock management, multi-level nested interrupt management, communication and synchronization of the basic functions of low-level hardware-dependent task scheduling. In other words, the real-time kernel in the existing open CNC system is not aimed at the specific real-time control process, but aimed at the contingency mechanism of operating system to respond and handle the internal/external environment changes.

In fact, due to the complexity of industrial environment, differences between real-time processes are great. For different real-time processes, a uniform contingency mechanism violated the rule of "making a concrete analysis of concrete conditions", it inevitably spends a lot of computing resources and reduces efficiency. For numerical control, as the core of the CNC software system, the above real-time kernel also has the following problems.

In the real-time kernel, the key technology is scheduling/thread scheduling. The real-time complicates process scheduling, and parallel algorithm further complicates process scheduling. More troublesome is the thread scheduling. Compared with the concurrency of the pipeline in machine instruction level and concurrency of process scheduling in processor-level, the uncertainty of the concurrency of thread scheduling is extremely complex. Process and thread, plus parallel algorithm, it leads to highly complicate the real-time operating system, and further to highly complicate the CNC software system. For a multi-axis control with high-speed and high-precision, the CNC software system is certainly a large and complex system it use parallel algorithm, multi-process scheduling/multi-thread scheduling, multi-nested calls, and multi-nested real time interrupts. In order to develop this vast and complex interrupt system, it is necessary to be proficient in digital control technology, but also proficient in computer software and hardware architecture, but also proficient in parallel algorithm and multi-thread programming. This means that the CNC software system is to become so-called system by experts, that is a system to be developed only by experts proficient in the above techniques, and users can not secondary develop, thus the CNC system completely lost openness.

The real-time operating system is very complex, therein is a lot of hidden potential vulnerabilities. The problem is, no one can fully understand an operating system. Thus, these vulnerabilities often require ten or more years to repair, and it is difficult to completely eliminate. Statistical data indicate that for the reliability of computer system, hardware error is only a few percent, the vast majority of errors from the system management. Obviously, system management errors are basically derived from the operating system. In particular, due to eternity and uncertainty of the delay, disturbances from the process scheduling/thread scheduling should be the main cause of the system management errors. Therefore, for reliability of the CNC system, the real-time operating system likes the sword of Damocles.

As is known, for numerical control of a mechanical system, so-called real-time control is to control relevant axes, and to compose a tool-path.

TABLE 1

| $\Delta t_1$ | $\Delta t_2$ | ... | $\Delta t_i$ | ... | $\Delta t_n$ |
|---|---|---|---|---|---|
| $\Delta X_1$ | $\Delta X_2$ | ... | $\Delta X_i$ | ... | $\Delta X_n$ |
| $\Delta y_1$ | $\Delta y_2$ | ... | $\Delta y_i$ | ... | $\Delta y_n$ |
| $\Delta Z_1$ | $\Delta Z_2$ | ... | $\Delta Z_i$ | ... | $\Delta Z_n$ |
| $\Delta A_1$ | $\Delta A_2$ | ... | $\Delta A_i$ | ... | $\Delta A_n$ |
| $\Delta B_1$ | $\Delta B_2$ | ... | $\Delta B_i$ | ... | $\Delta B_n$ |

In general, the five axes are given simple names such as X, y, Z, A, B, and the tool-path is a function of the five variables X, y, Z, A, B. In the Table 1, the coordinate value increments (briefly, denoted as increments) received by five servo drivers are listed according to the time sequence.

The time T is divided into n discrete intervals: $\Delta t_1, \ldots, \Delta t_n$, the increments of X, y, Z, A, B in the interval $\Delta t_i$ are $\Delta X_i$, $\Delta y_i$, $\Delta Z_i$, $\Delta A_i$, $\Delta B_i$.

In the existing open CNC system based on the IEEE definition, $\Delta t_1, \ldots, \Delta t_n$ are time-sharing cycle of real-time operating systems and have equal length, known as the interpolation cycle. Under the control of a real-time operating system, the micro-segment $\Delta L_i$ ($\Delta X_n$, $\Delta y_n$, $\Delta Z_n$, $\Delta A_n$, $\Delta B_n$) is calculated by an iterative interpolation control algorithm in $\Delta t_i$, there i=1, ..., n. For example, in order to produce the resultant displacement $\Delta L_1$, the micro-segment $\Delta L_1$ ($\Delta X_1$, $\Delta y_1$, $\Delta Z_1$, $\Delta A_1$, $\Delta B_1$) are calculated in the interpolation cycle $\Delta t_1$, and are sent into the servo drivers X, y, Z, A, B in a communication cycle of the fieldbus; $\Delta X_1$, $\Delta y_1$, $\Delta Z_1$, $\Delta A_1$, $\Delta B_1$ are fed in a sampling cycle of the servo drivers; then the $\Delta t_2$ starts, until $\Delta t_n$, and the resultant displacement $\Delta L_n$ is produced, and so on.

Here, the real time process includes three aspects:

1. The real-time operating system calculates five increments of the axes X, y, Z, A, B in an interpolation cycle;

2. The increments are sent into the five servo drivers X, y, Z, A, B in a communication cycle of the fieldbus;

3. The five increments are fed in a sampling cycle of the servo drivers.

In the data flow related control, under control of $\Delta t_1, \ldots, \Delta t_n$, the increments received by axes related to a tool-path are called the incremental related data flow of the tool-path. A related data flow with 5-axes linkage is a five dimensions related data flow.

In the data flow related control, All of the intervals $\Delta t_1, \ldots, \Delta t_n$ are called the T-division of tool-paths. The $\Delta t_i$, there i=1, ..., n (briefly, denoted as $\Delta t_i$ (i=1, ..., n)), is called control rhythm, which is different from the interpolation cycle, and their length usually is unequal. All of the micro-segments $\Delta L_1, \ldots, \Delta L_n$ are called the L-division of tool-paths. The T-division and the L-division are dependent on geometric characteristics of tool-paths and kinematics/dynamics characteristics of axes, and are independent on the control rhythm. The core task of PC systems is decompress digital control information that are compressed in a tool-path and feed rate, and to manufacture the related data flow of the tool-path, i.e. to plan the T-division and the L-division of the tool-path. Thus, the generating processes of the T-division and the L-division become a non real-time process.

The digital image of the L-division generated in a storage space by a given data format is called the linkage-table of the tool-path. The digital image of the T-division generated in a storage space by a given data format is called the follow-table of the tool-path.

Based on L-planning, the L-division of a tool-path is stored as a linkage-table file. According to linkage axes, the linkage-table is divided some axis linkage-tables. For example, the axis linkage-table $\Delta X_i$ (i=1, ..., n) of the X-axis, the axis linkage-table $\Delta y_i$ (i=1, ..., n) of the y-axis, and so on. Further, before machining, if the axis linkage-tables of all axes are distributed to the relevant servo drivers, the distributing process are also non-real-time.

The distributing process of the axis linkage-tables was non-real-time, in order to control linkage of axes, synchronous pulses are sent into the relevant servo drivers designated by the state-word. The synchronous pulses controlled by the state-word are called linkage commands.

Thus, real-time control process of tool-paths is simplified as follows. According to the control rhythm in the follow-table, linkage commands are sent into the servo drivers designated by the state-word; following the linkage commands, the servo drivers write increments in their axis linkage-tables into their position loops, and feed their axes to produce resultant displacements.

SUMMARY OF THE PRESENT INVENTION

Based on the non real-time of generating and distributing of the L-division and the T-division of a tool-path, the present invention proposes a real-time kernel of open CNC systems and a real-time control method of the tool-path.

The real-time kernel of open CNC systems, comprising: a read file module, a linkage axes set module, a linkage command set module, a rhythm control module, and a end-point control module;

the read follow-table file module is used to read control information from a follow-table, the control information comprising: a plurality of sequence-codes, a plurality of segment-codes, a plurality of state-words, and a plurality of control rhythms $\Delta t_i$ (i=1, ..., n);

the linkage axes set module is used to read an address from a follow-table and to write the address into a T-pointer, and to read a state-word from a follow-table and to write the state-word into a state-word register, the address and the state-word is designated by a sequence-code and a segment-code of a path-instruction;

the linkage command set module is used to read one control rhythm from the follow-table and to write the control rhythm into a T-timer according to the T-pointer;

the rhythm control module is used to start a pulse generator and to output a pulse, the pulse send a linkage command into the servo drivers designated by the state-word if time of the T-timer is up; and the end-point control module is used to control a endpoint of the micro-segment of the tool-path.

Further, the real-time kernel comprising: an independent microprocessor with an interrupt control module; the interrupt control module is used to handle real-time feedback information from the servo drivers.

A real-time control method of tool-paths, is used to control servo drivers to feed axes in order to produce resultant displacements, comprising:

receiving the control (1), which is configured to set a run flag for the real-time kernel, and the real-time kernel receives control when a PC system executes a path-instruction;

setting linkage axes (2), which is configured to read an address from a follow-table and to write the address into a T-pointer, and to read a state-word from the follow-table and to write the state-word into a state-word register, the address and the state-word is designated by a sequence-code and a segment-code of a path-instruction, so as to set the linkage axes in a micro-segment of the tool-path;

setting linkage command (3), which is configured to read one control rhythm from the follow-table and to write the control rhythm into a T-timer according to the T-pointer;

controlling rhythm (4), which is configured to start a pulse generator and to output a pulse, the pulse send a linkage command into servo drivers designated by the state-word register if time of the T-timer is up;

feeding axes (5), which is configured to read a increment from a axis linkage-table and to write the increment into the position loop according to a L-pointer after servo drivers received the linkage command, in order to produce a resultant displacement;

controlling endpoint (6), which is configured to control the endpoint of the micro-segment of the tool-path; if the T-pointer is equal to the end address of the follow-table of the micro-segment, i.e. to reach the end of the micro-segment, then to repeat (2) to (6); otherwise, to repeat (3) to (5);

if the T-pointer is equal to the end of the end address of the follow-table, i.e. to reach the end of the tool-path, then to turn off the run flag; and transferring of the control (7), which is configured to transfer the control from the real-time kernel to the PC system while the PC system queries the running state of the real-time kernel, if the run flag is turned off.

As compared with prior technology, the original beneficial effects of the invention are:

1. A Major Change of Digital Control Method

In existing open CNC system based on the IEEE definition, in order to solve the real-time of real-time operating systems, it must configure a real-time kernel must in multi-user time-sharing operating systems. The so-called real-time kernel is the core of NC software system, it involves clock management with high-precision, multi-level nested interrupt, and communication/synchronization of task scheduling, which are related to scheduling/thread scheduling in the real-time operating system, and other basic functions that depend on low-level hardware.

In the real-time kernel in the present invention, the control rhythms in the follow-table replaces the interpolation cycle, it eliminates the control of the real-time operating system in real-time control process, the easiest sending linkage command replaces the highly complex real-time communication, and the control of fieldbus in real-time control process is also eliminated. Therefore, it completely removes the restriction of real-time operating system and fieldbus on real-time control process, and achieves the openness for real-time control method and real-time control process, leads to major changes in the field of digital control method.

2. Multi-Axis Synchronization Mechanism with High-Precision

Multi-axes synchronous drive technology is a key technology urgently to be solved in existing CNC technology. In "project 18: all-digital high-grade CNC device" of "high-grade CNC machine tools and basic manufacturing equipment" (the Chinese 2009 major projects for science and technology), biaxial synchronous drive technology is a key technology of the existing CNC technology.

In existing open CNC system based on the IEEE definition, multi-axis synchronization depends on real-time synchronization mechanism of fieldbus in communication cycle.

Simple is beautiful.

In the present invention, a multi-axis synchronization depends on linkage commands sent in real time through a linkage interface, the linkage axes are designated by the state-word. The linkage command is a plurality of parallel synchronous pulses. The state-word is a user's parameter, and the linkage interface is similar to a parallel interface controlled by the state word. Therefore, the real-time kernel in the present invention solves the problem of multi-axes synchronization mechanism it is used the most simple technical solution, and has multi-axis synchronization capability with high-precision, it translates complex the multi-axis synchronous drive technology to into the most simple conventional technique.

3. Highly Simple Function and Architecture

The real-time kernel in the present invention does not need to configure a operating system, its core function is only to write the control rhythm into a T-timer, and to send linkage commands into servo drivers designated by the state-word, its function and architecture are extremely simple and can be standardized.

4. High Reliability

As is known, in the existing open CNC system based on the IEEE definition, the interpolation cycle and the communication cycle are two system parameters, they not only cost a lot of computing resources, but also all control flow, including generating sub-process, distribution sub-process, sending sub-process, and executing sub-process of digital control information, are became a real-time process, and lead to real-time operating system and fieldbus are two keys to constraint on reliability of CNC system.

In the present invention, the real-time kernel does not need to configure real-time operating system and fieldbus, and eliminates the effects of both to the reliability and has high reliability.

BRIEF DESCRIPTION OF THE DRAWINGS

FIG. 1 is a functional block diagram of a real-time kernel of open CNC systems.

DETAILED DESCRIPTION OF THE PREFERRED EMBODIMENT

When a workpiece is being machined, there are three processes: an auxiliary process, a tool replacement process and a cutting process.

The auxiliary process is to control auxiliary functions controlled by I/O device and state sets.

The tool replacement process is to control of tool magazine. For the tool replacement process, it is used generally conventional PLC or soft PLC to control tool magazine. The present invention is no related to PLC and control of I/O devices.

Therefore, a CNC system has only three states: operation of auxiliary functions, switching control, real-time control of tool-paths.

The data flow related control is used three types of motion instruction to describe the above three processes: the state-instructions, the switch-instructions, and the path-instructions.

The state-instructions are used to control auxiliary functions.

The state-instructions are used to control I/O devices.

The path-instructions are used to control servo drivers, and to describe the cutting process of tool-paths.

The state-instructions, the switch-instructions, and the path-instructions are used to describe the machining process of the workpiece.

Unlike the existing G-code NC program, the NC program that uses the motion instructions is called the DRC NC program in the present invention.

The path-instruction is a single byte instruction, its instruction code is:

B7: ID-code of path-instruction, for example, B7=0;

B6~B0: 7 bit sequence-code, which is used to identify sequence of the path-instructions.

The sequences-code establishes one-to-one correspondence between the path-instruction and its linkage-table and follow-table.

In the present invention, the path-instructions have only one format, regardless of type of tool-paths.

A tool-path is often composed of multiple curves, for example, lines and circles. The present invention uses one path-instruction to describe the cutting process of the tool-path.

In the present invention, according to the linkage axes, the linkage-table of the tool-path is divided some axis linkage-tables. For example, the axis linkage-table $\Delta X_i$ (i=1, ..., n) of the X axis linkage-table, the y axis linkage-table $\Delta y_i$ (i=1, ..., n) of the y-axis, and so on.

For a tool-path composed of multiple curves, therein the geometrical structure of each curve may be the same or different, the linkage axes of each curve may be also the same or different. This means that, for the different $\Delta t_i$, the linkage axes are often different. Therefore, according to the linkage axes, the follow-table is divided into some sections that are identified by segment-codes.

In the follow-table, a state-word is set, which is used to identify the linkage axes in a section. The state-word is one byte, its bits can be 32, 16, 8. For example, the state-word with eight bits linked to eight axes. From low to high, every bit of the state-word controls a servo-on state of a servo driver and its data channel. For example, the state-word "11100000" designates the servo drivers of axes X, y, Z, the state-word "00011000" designates the servo drivers of axes A, B.

Bits and bytes of the state-word are the user parameters. Users can set the bits and bytes of the state-word by the state-instructions.

For some cutting processes, there have some path-instructions in the DRC NC program.

The sequence-code of each path-instruction identifies position of the path-instruction in the DRC NC program.

The axis linkage-table of a path-instruction is a subfile, in its directory there is the sequence-code of the path-instruction; the follow-table of each path-instruction is also a subfile, in its directory there is also the sequence-code of the path-instruction. Thus, for all path-instructions, the sequence-code establishes one-to-one correspondence between each path-instruction and its axis linkage-table and follow-table.

According to different linkage axes, the follow-table of a path-instruction is divided into some sections that are identified by segment-codes; linkage axes in one section are the same. A state table in the follow-table is used to store the state-words of the sections, one state-word is used to designate linkage axes in one section. The axis linkage-table is also divided into some sections that are also identified by the segment-codes, the number of the sections is equal with the number of the sections in the follow-table. Thus, for each path-instruction, the segment-code establishes one-to-one correspondence between the axis and its axis linkage-table and follow-table of the path-instruction.

The axis linkage-tables were distributed to the relevant servo drivers in the auxiliary process. If an axis in a micro-segment does not feed, its axis linkage-table is marked as an empty file. During executing, for the section marked as an empty file, the servo driver skips when the linkage command received. In linkage of X, y, Z, for example, in the m-th section from $\Delta L_i$ to $\Delta t_k$, only X and Z linkage, the state-word of the m-th section is 10100000. Accordingly, the m-th section of the y-axis linkage-table is empty, i.e. during $\Delta t_i$ to $\Delta t_k$, the y-axis stops.

Thus, real-time control process of tool-paths is simplified as follows. According to the control rhythms in the follow-table, under control of the state-words, linkage commands are sent into the servo drivers through a linkage interface; following the linkage commands, the servo drivers write increments in their axis linkage-tables into their position loops, and feed their axes to produce resultant displacements.

The linkage command is a plurality of parallel synchronous pulses. The linkage interface is similar to a parallel interface controlled by the state word.

Based on the above description for the real-time control process of tool-paths, the present invention provides a real-time kernel of open CNC systems.

A real-time kernel of open CNC systems shown in FIG. 1, comprising: a linkage axes set module (1), a linkage command set module (2), a rhythm control module (3), an end-point control module (4).

The linkage axes set module (1) is used to read an address from a follow-table and to write the address into a T-pointer, and to read a state-word from a follow-table and to write the state-word into a state-word register, the address and the state-word is designated by a sequence-code and a segment-code of a path-instruction, in order to set the linkage axes in a micro-segment of a tool-path;

The linkage command set module (2) is used to read a control rhythm from the follow-table and to write the control rhythm into a T-timer according to the T-pointer;

The rhythm control module (3) is used to start a pulse generator and to output a pulse, the pulse send a linkage command into the servo drivers (400) designated by the state-word through the linkage interface (300) if time of the T-timer is up; and The end-point control module (4) is used to control the end-point of the micro-segment and the end-point of the path-instruction.

The PC system (100) generates the follow-table it is used standard file format, such as FAT16, FAT32. In order to read the sequence-codes, the segment-codes, the state-words, the control rhythms $\Delta t_i$ (i=1, . . . , n), and other control information in the follow-table, the real-time kernel configures a read follow-table file module (5) it is used to read the above information. Thus, the real-time kernel does not need to configure a real-time operating system, and is independent on hardware and software platform of the PC system (100).

Further, the real-time kernel comprising: an independent microprocessor (7) with an interrupt control module (6); the interrupt control module is used to handle real-time feedback information from the servo drivers.

In this technical solution, the PC system (100) is used to run a DRC NC program. When a path-instruction is executed, the PC system (100) send a command to the real-time kernel, the command is used to set a run flag, the control is transferred to the real-time kernel.

According to the control rhythms, the real-time kernel controls the executing process of a path-instruction, the real-time control process of the tool-path is as follows.

Setting Linkage Axes

The linkage axes set module (1) reads an address from a follow-table and writes the address into a T-pointer, and reads a state-word from the follow-table and writes the state-word into a state-word register, the address and the state-word is designated by a sequence-code and a segment-code of a path-instruction. So, the linkage axes in a micro-segment of the tool-path are set.

Setting Linkage Command

The linkage command set module (2) reads one control rhythm from the follow-table and writes the control rhythm into a T-timer according to the T-pointer.

Controlling Rhythm

The rhythm control module (3) starts a pulse generator and outputs a pulse, the pulse sends a linkage command into servo drivers designated by the state-word register if time of the T-timer is up.

Feeding Axis

After the servo drivers received the linkage command, they read increments from their axis linkage-tables and write the increments into their position loops according to a L-pointer in order to produce a resultant displacement.

Controlling Endpoint (1) To Control the Endpoint of the Micro-Segment

In order to control the endpoint of the follow-table of a section that corresponds to a micro-segment, the T-pointer of the real-time kernel is compared with the end addresses of the follow-table of the section. If the T-pointer is equal to the end addresses of the follow-table of the section, then the first address of the follow-table of the next section is written into the T-pointer; the state-word of the next section is read from the state-table of the follow-table and is written into the state-word register; the real-time control of the next micro-segment continues.

In order to control the endpoint of the axis linkage-table of a section that corresponds to a micro-segment, the L-pointer of the servo driver is compared with the end addresses of the axis linkage-table of the section. If the L-pointer is greater than the end address of the axis linkage-table of the section, then the first address of the next non-empty section of the axis linkage-table is written into the L-pointer.

(2) To Control the Endpoint of the Path-Instruction

In order to control the endpoint of an axis, the L-pointer in the servo driver of the axis is compared with the end addresses of its axis linkage-table. If the L-pointer is greater than the end address of the axis linkage-table, then the run flag of the axis is set "0", and the axis linkage-table of the next path-instruction is executed.

In order to control the endpoint of the path-instruction, the T-pointer of the real-time kernel is compared with the end addresses of the follow-table. If the T-pointer is equal to the end address of the follow-table, i.e. the endpoint of the path-instruction is reached, then the run flag of the real-time kernel is closed, and the next path-instruction is executed.

After the DRC NC program in the PC system (100) transferred the control to the real-time kernel, the DRC NC program is in a query state, and check the operating state of the real-time kernel, once the run flag of the real-time kernel is shut, then the DRC NC program takes back the control, and handles the next motion instruction.

Thus, the real-time control process of tool-paths is simplified as follows. According to the control rhythms in the follow-table, the servo drivers designated by the state-word read the increments from their axis linkage-tables and write the increments into their position loops. The real-time kernel sends linkage commands into servo drivers through the linkage interface; following the linkage commands, the servo drivers feed their axes to produce resultant displacements. Again and again, until the T-pointer reaches the end address of the follow-table, i.e. reaches the end of the path-instruction.

For five axes X, y, Z, A, B, the state-word is "11111000", the real-time control process is as follows. The real-time kernel writes a control rhythm into the T-timer, and a plurality of linkage commands are sent to a plurality of servo drivers through the linkage interface; the plurality of servo drivers follow the plurality of linkage commands, and synchronously read $\Delta X_i$, $\Delta y_i$, $\Delta Z_i$, $\Delta A_i$, $\Delta B_i$ from the respective axis linkage-tables and write them into the respective position loops, and feed the respective axes to produce resultant displacement $\Delta L_i$. Again and again, until the path-instruction is ended.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

I claim:

1. A computer numerical control system with real-time kernel, comprising: a read follow-table file module, a linkage axes set module, a linkage command set module, a rhythm control module, and an end-point control module;

the read follow-table file module reads control information from a follow-table, the control information comprising: sequence-codes, segment-codes, state-words and control rhythms $\Delta t_i$ (i=1, . . . , n);

the linkage axes set module reads an address from the follow-table and writes the address into a T-pointer, reads the state-word from the follow-table and writes the state-word into a state-word register, the address and the state-word is designated by the sequence-code and the segment-code of a path-instruction;

the linkage command set module reads one control rhythm from the follow-table and to writes the control rhythm into a T-timer according to the T-pointer;

the rhythm control module starts a pulse generator and then outputs a pulse, the pulse sends a linkage command into the servo drivers designated by the state-word if time of the T-timer is up; and the end-point control module controls an end-point of the micro-segment of the tool-path, wherein the system further comprises:

an independent microprocessor with an interrupt control module; the interrupt control module is used to handle real-time feedback information from the servo drivers.

2. A real-time control method of tool-paths, which is used to control servo drivers to feed axes in order to produce resultant displacements, comprising the steps of:

receiving the control (1), which is configured to set a run flag for the real-time kernel, and the real-time kernel receives the control when a personal computer system executes a path-instruction;

setting linkage axes (2), which is configured to read an address from a follow-table and to write the address into a T-pointer, and to read a state-word from the follow-table and to write the state-word into a state-word register, the address and the state-word is designated by a sequence-code and a segment-code of a path-instruction, so as to set the linkage axes in a micro-segment of the tool-path;

setting linkage command (3), which is configured to read one control rhythm from the follow-table and to write the control rhythm into a T-timer according to the T-pointer;

controlling rhythm (4), which is configured to start a pulse generator and to output a pulse, the pulse send a linkage command into servo drivers designated by the state-word register if time of the T-timer is up;

feeding axes (5), which is configured to read a increment from an axis linkage-table and to write the increment into the position loop according to a L-pointer after servo drivers received the linkage command, in order to produce a resultant displacement;

controlling endpoint (6), which is configured to control the endpoint of the micro-segment of the tool-path; if the T-pointer is equal to the end address of the follow-table of the micro-segment and is to reach the end of the micro-segment, then to repeat (2) to (6); otherwise, to repeat (3) to (5);

if the T-pointer is equal to the end of the end address of the follow-table, and is to reach the end of the tool-path, then to turn off the run flag; and transferring of the control (7), which is configured to transfer the control from the real-time kernel to the PC system while the PC system queries the running state of the real-time kernel, if the run flag is turned off.

* * * * *